US 6,744,579 B2

(12) United States Patent
Forrer, Jr.

(10) Patent No.: US 6,744,579 B2
(45) Date of Patent: Jun. 1, 2004

(54) METHODS FOR DETECTING AND MITIGATING THE EFFECTS OF HARD DRIVE HEAD CRASHES

(75) Inventor: Thomas R. Forrer, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 10/015,379

(22) Filed: Dec. 17, 2001

(65) Prior Publication Data

US 2003/0112537 A1 Jun. 19, 2003

(51) Int. Cl.[7] .............................. G11B 33/14; G11B 5/09
(52) U.S. Cl. ................... 360/31; 360/97.02; 360/77.03; 360/234.3; 360/234.4; 360/234.5; 360/53; 360/75
(58) Field of Search ............................. 360/31, 25, 53, 360/75, 77.02, 77.04, 69, 235.4, 234.4, 234.3, 234.5, 71, 97.02, 77.03

(56) References Cited

U.S. PATENT DOCUMENTS

| 4,812,927 A | * | 3/1989 | Fechner ...................... 360/75 |
| 4,853,810 A | * | 8/1989 | Pohl et al. ................ 360/234.7 |
| 5,410,439 A | * | 4/1995 | Egbert et al. .................. 360/75 |
| 5,659,447 A | * | 8/1997 | Gregory et al. ............. 360/237 |
| 5,870,241 A | * | 2/1999 | Ottesen et al. ........... 360/77.02 |
| 6,052,243 A | * | 4/2000 | Shimada ...................... 360/46 |
| 6,344,938 B1 | * | 2/2002 | Smith .......................... 360/25 |
| 2003/0007268 A1 | * | 1/2003 | Smith .......................... 360/31 |

* cited by examiner

Primary Examiner—David Hudspeth
Assistant Examiner—Natalia Figueroa
(74) Attorney, Agent, or Firm—Duke W. Yee; Mark E. McBurney; Betty G. Formby

(57) ABSTRACT

A method for detecting head-to-disk interference events in a disk drive is provided. The invention comprises coupling a transducer to an air filter in the disk drive, wherein the transducer detects changes in magnetic readings due to debris produced by physical contact between a read/write head and a magnetic storage medium (head crash). The recirculation filter is monitored during disk drive operations and comparing magnetic readings from the transducer with defined parameters. If the transducer readings exceed the defined parameters, the spindle motor of the disk drive is shut off, thus stopping the rotation of the disk and minimizing data loss and damage due to the head crash.

19 Claims, 4 Drawing Sheets

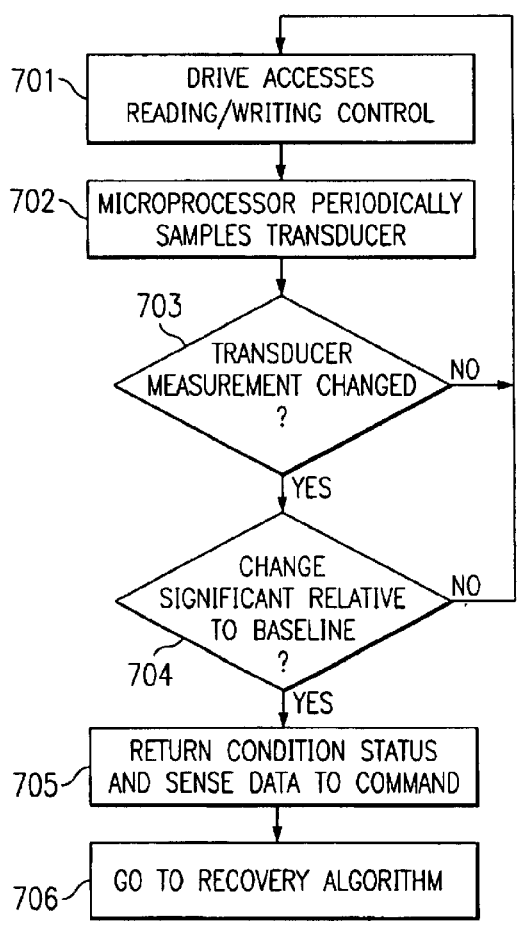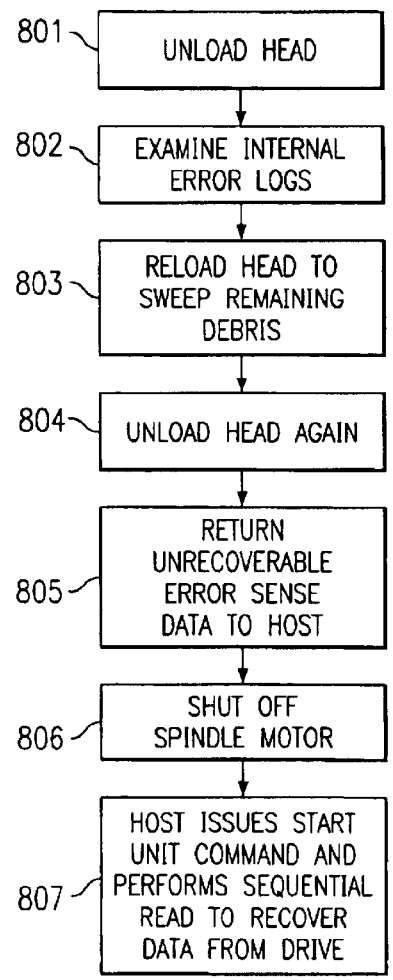

METHODS FOR DETECTING AND MITIGATING THE EFFECTS OF HARD DRIVE HEAD CRASHES

BACKGROUND OF THE INVENTION

1. Technical Field

The present invention relates generally to computer hard drives and more specifically to the interaction of the hard disk with the read/write head.

2. Description of Related Art

Under normal operating conditions, the read/write head of a hard drive does not come into physical contact with the hard disk, but instead rides an air cushion just above the surface of the disk. However, failures can occur, wherein the head come into contact with the disk, resulting in damage to the disk and/or interference with the reading and writing of data. This event is referred to as a head crash or Head-to-Disk Interference (HDI) event. When the read/write head comes in contact with the disk, it can cause extensive loss of data because the magnetic coating on the disk is removed or otherwise made unreadable.

The magnetic debris resulting from head/disk contact is circulated within the head/disk enclosure until it is deposited on an internal drive filter element. If it were possible to detect the beginning of a head crash event early enough it would be possible to mitigate the loss of data before it became catastrophic.

Therefore, it would be desirable to have a method for detecting the beginning of a HDI event and minimizing its effects.

SUMMARY OF THE INVENTION

The present invention provides a method for detecting head-to-disk interference events in a disk drive. The invention comprises coupling a transducer to an air filter in the disk drive, wherein the transducer detects changes in magnetic readings due to debris produced by physical contact between a read/write head and a magnetic storage medium (head crash). The recirculation filter is monitored during disk drive operations and comparing magnetic readings from the transducer with defined parameters. If the transducer readings exceed the defined parameters, the spindle motor of the disk drive is shut off, thus stopping the rotation of the disk and minimizing data loss and damage due to the head crash.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 depicts a flowchart illustrating drive operation and head crash detection in accordance with the present invention; and FIG. 8 depicts a flowchart illustrating the recovery algorithm in accordance with the present invention.

DETAILED DESCRIPTION OF THE PREFERRED EMBODIMENTS

Figure 1:
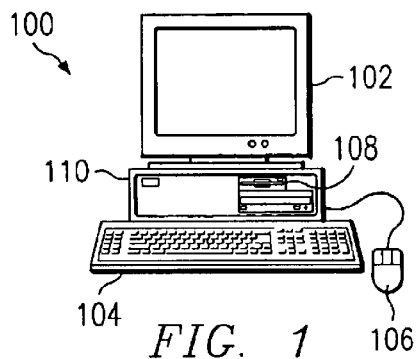
FIG. 1 depicts a pictorial representation of a data processing system in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
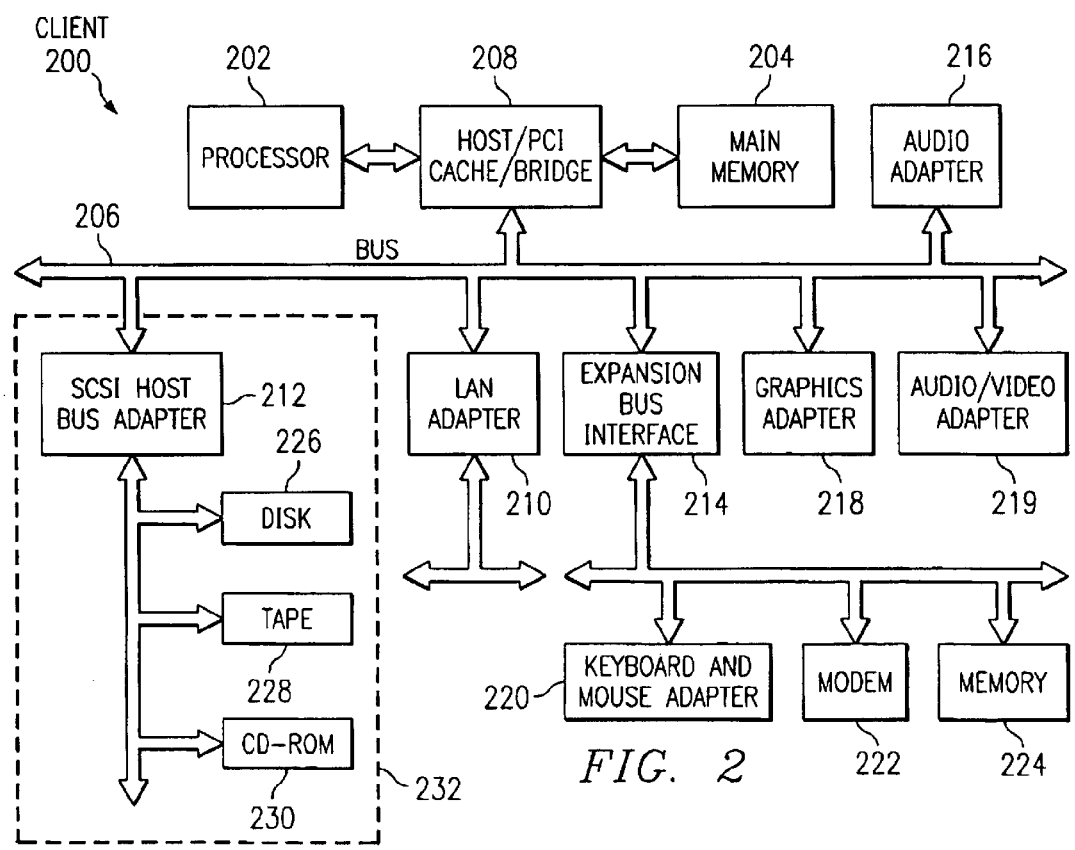
FIG. 2 depicts a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

Figure 3:
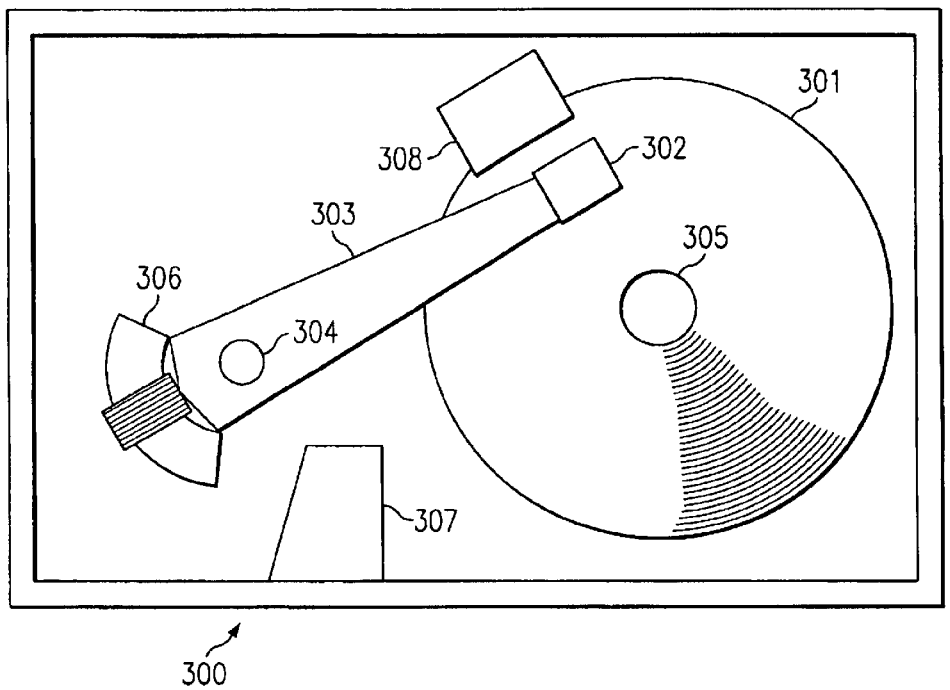
FIG. 3, a pictorial diagram of a hard drive is depicted in which the present invention may be implemented.

Referring to FIG. 3, a pictorial diagram of a hard drive is depicted in which the present invention may be implemented. The head-disk assembly (HDA) 300 contains a hard disk 301, a read/write head 302, and the actuator arm 303, which controls the movement of the head 302 over the disk 301.

The hard disk 301 accommodates data in the form of tiny magnetic transitions. A magnetic coating (data medium) is deposited on the disk 301, which is made of aluminum or glass. A thin diamond like carbon (DLC) layer is also deposited on disk 301 to protect the magnetic medium against mechanical damage. Finally, a thin lubricant film is applied to the disk surface to provide wear and corrosion resistance. Data is recorded on disk 301 in sectors, identified by their Logical Block Addresses (LBA's) which are arranged in a sequential manner around each track. Usually LBA 0 is located at head 0, track 0, sector 0. The LBA sequentially increases from there. Current disk drives use an interleave factor or 1:1. The rotation of disk 301 is controlled by spindle 305, which is stabilized by a feedback control circuit to maintain a constant speed, ensuring more accurate data recording and retrieval.

The read/write head 302 writes data onto disk 301 as tiny magnetic transitions, or detects these magnetic transitions as data bits. Note that various data encoding schemes are used to optimize the ability of the read electronics to accurately reproduce the information written on the disk. The head 302 is moved over disk 301 by actuator arm 303, which rotates about actuator shaft 304. The actuator arm 303 allows the head to be positioned above the correct disk sector(s) in order to read or write data. When the disk drive 300 is off, the head 302 rests on a load/unload ramp 308.

In the present example, the movement of actuator arm 303 is controlled by "voice coil" motor 306. Similar to the voice coil of a speaker, the movement of the voice coil motor 306 is determined by the amount and direction of current moving through a coil positioned in a uniform DC magnetic field.

HDA 300 also has an air recirculation filter 307, which filters the air already in the HDA case. There is a separate "make up filter" whose purpose is to provide an air circulation path to equalize the air pressure between the inside of the drive and the ambient environment. The purpose of the recirculation filter is to remove microscopic wear debris created during the operation of the moving/rotating elements, as well as HDI events between the head 302 and disk 301. The rotating disk 301 generates air circulation which moves the microscopic contamination to the recirculation air filter 307, which removes this debris.

Figure 4:
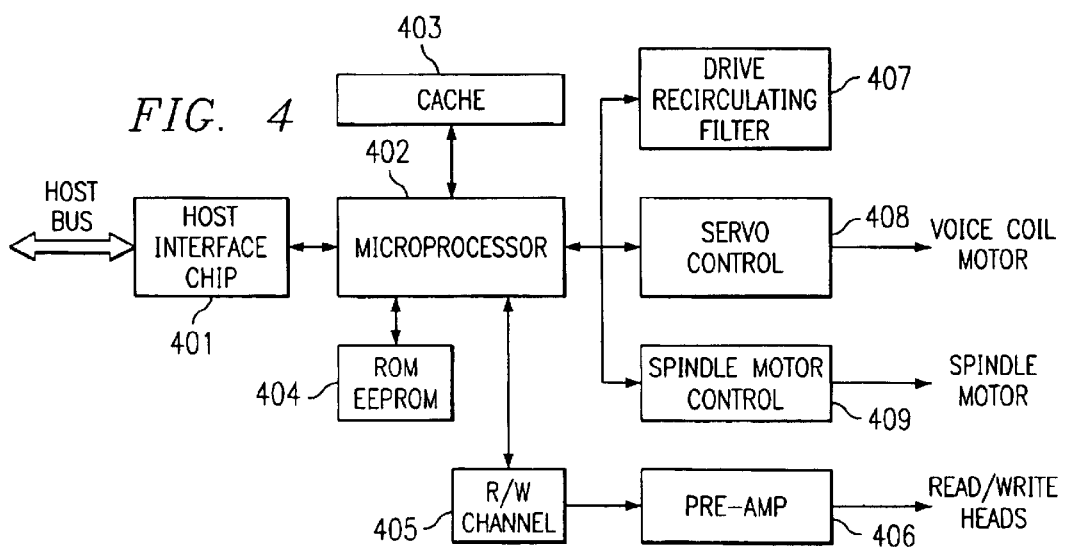
FIG. 4 depicts a block diagram of a hard drive in accordance with the present invention.

Referring to FIG. 4, a block diagram of a hard drive is depicted in accordance with the present invention. The host interface chip 401 provides the connection between the hard drive controller and the computer using the hard drive. Read/write commands and command data for the controller are exchanged by means of the interface 401. The microprocessor 402 controls the host interface 401 and the controller-internal logic elements. For this purpose, a machine program is stored in the microcode of the ROM (or EEPROM) 404 used by the microprocessor 402. The cache 403 holds the data to be written into or read from a sector of the hard disk.

Read and write data are communicated to the read/write head via the read/write channel 405 and preamplifier 406, which boosts the signal to the hardware. The microprocessor controls the rotation of the hard disk by means of the spindle motor control 409, and the motion of the actuator arm is controlled by means of the servo control 408, which drives the voice coil motor described in FIG. 3.

The microprocessor 402 also monitors the drive recirculation filter 407, which has an imbedded transducer to measure changes in conductance, capacitance or inductance as disk debris accumulates on the filter 407. This approach takes advantage of the fact that the debris generated by a head crash is a conductive magnetic material. The sensor can be calibrated in the factory during the drive manufacturing burn-in process.

Figure 5A:
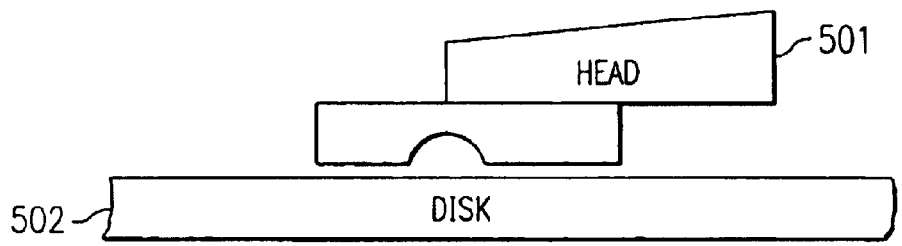
FIG. 5A depicts a pictorial diagram illustrating the position of a read/write head relative to a hard disk during normal function.

Referring to FIG. 5A, a pictorial diagram illustrates the position of a read/write head relative to a hard disk during normal function. In order to generate and detect small magnetic transitions for high density data storage, it is necessary for the read/write head 501 to be as close as possible above the hard disk 502. When the hard drive is off, the head 501 rests off the disk 502, on a ramp located at the outer diameter, e.g., ramp 308 in FIG. 3. When the hard drive is turned on and the spindle motor begins rotating the hard disk 502, an air stream is generated which provides a microscopic air bearing upon which the head 501 flies above the disk 502. When the disk 502 reaches an appropriate angular velocity, the drive servo moves the head 501 from the ramp to the disk 502, at which time the air bearing is established between the head 501 and disk 502.

Note that other disk drive technology exists in which the heads are parked in a landing zone that is physically located at the inner diameter of the drive when the disks are not rotating.

Figure 5B:
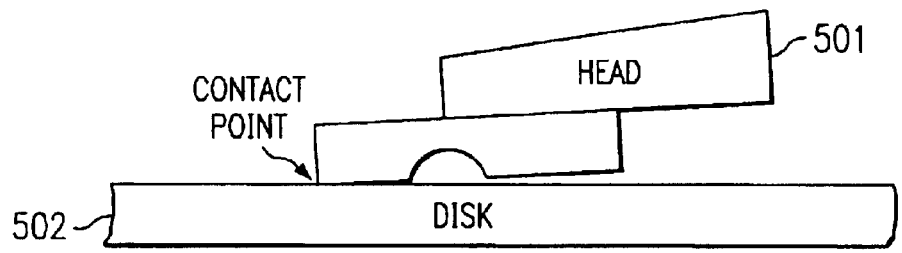
FIG. 5B depicts a pictorial diagram illustrating a head crash.

FIG. 5B depicts a pictorial diagram illustrating a head crash. Contact between the head 501 and disk 502 (head crash) can be caused by several factors including misalignment and particulate contamination. A head crash which occurs while the disk 502 is rotating at high speeds will cause the head 501 to scrape off and damage the magnetic data medium and protective DLC coating, which results not only in loss of data and damage to the head 501, but also creates additional particulate contamination which can lead to additional head crashes.

It should be pointed out that the example disk drive described above, has only one disk and one read/write head. This example is used for the sake of simplicity. However, many modern disk drive comprise several disks stacked on top of each other with small spaces in between the disks to accommodate multiple heads which are mounted on a single actuator arm.

The present invention provides a method for detecting the occurrence of a HDI and offers algorithms that can be used to mitigate the effect of the HDI to minimize data loss. The early detection of a head crash is accomplished by means of the transducer imbedded in the drive filter unit described above.

Figure 6:
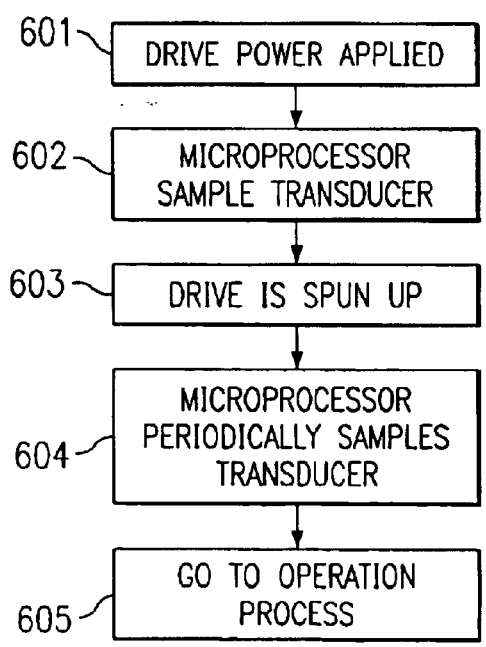
FIG. 6 depicts a flowchart illustrating the hard drive power-on sequence in accordance with the present invention.

Referring to FIG. 6, a flowchart illustrating the hard drive power-on sequence is depicted in accordance with the present invention. After power is applied to the hard drive (step 601), the microprocessor samples the transducer as part of the power on diagnostics (step 602). The drive is then spun up by the spindle motor (step 603). After the drive is up to speed, the microprocessor periodically samples the transducer in order to establish a baseline measurement (step 604). Once this baseline is established, the system moves over to the drive operation process (step 605).

Referring to FIG. 7, a flowchart illustrating drive operation and head crash detection is depicted in accordance with the present invention. During the recording and reading of data, the hard drive accesses the read/write control (step 701). As reading and writing occurs, the microprocessor continues to periodically sample the transducer (step 702) and determines if the transducer measurements have changed (step 703). The algorithm used by the microprocessor monitors the chosen property (resistance, capacitance, inductance) and looks for a sudden increasing change in this property. If the readings have not changed, the drive operations continue as normal. However, if there is a change in the transducer measurements, the microprocessor then determines if this change is significant relative to the baseline established during power-on (step 704). If the change is not significant, the drive operation continues as normal. If the change is significant, the condition status and sense data is returned to command (step 705) and the recovery algorithm is initiated (step 706).

Referring to FIG. 8, a flowchart illustrating the recovery algorithm is depicted in accordance with the present invention. When the recovery algorithm is initiated, the microcode in the drive unloads the head from the disk in order to allow time for the debris to be removed from the drive by the filter (step 801). During this idle period the disk drive microcode analyzes its internal error logs to determine the extent of the damage by mapping the recent occurrences of unrecoverable media errors and/or servo errors due to lack of servo information (step 802).

After a period of time, which is based upon the time it takes to filter all of the air inside the HDA, the head is loaded back onto the media and swept across the disk quickly to assist in cleaning further debris from the disk surface (step 803). The head is again unloaded after being swept across the disk in order to minimize further disk damage (step 804).

The drive responds to commands received from the host system with "Not Ready" Sense Key followed by a Sense Code indicating that the drive needs to be immediately backed up because it is failing (step 805), and the spindle motor is shut off (step 806).

After receiving the unrecoverable-media-error data from the drive, the host system issues a Start Unit Command when it is ready to begin the back up process, and performs sequential read operations to recover as much data from the drive as possible (step 807). The drive does not allow the head to access zones where there were multiple hard errors.

Without the present invention, when a HDI event occurs, the drive continues to attempt error recovery procedures that aggravate the failure to the point where it is very difficult, if not impossible, to determine the cause of the failure. With the present invention, the drive is able to detect the beginning of the HDI and initiate procedures to mitigate the problem, making it easier to determine the cause of the HDI.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for detecting head-to-disk interference events in a disk drive, the method comprising:

attaching a transducer to an air filter in the disk drive, wherein the transducer detects changes in electromagnetic readings due to debris flowing through the air filter, said debris produced by physical contact between a read/write head and a magnetic storage medium;

monitoring the transducer during disk drive operations and comparing electromagnetic readings from the transducer with baseline parameters; and if the transducer readings exceed the baseline parameters, halting rotation of the disk and unloading the read/write head from the magnetic storage medium.

2. The method according to claim 1, wherein the electromagnetic readings measured by the transducer relate to at least one of the following:

conductance;

inductance; and capacitance.

3. The method according to claim 1, wherein the baseline electromagnetic parameters are established by sampling the transducer while powering up the disk drive.

4. The method according to claim 1, further comprising:

analyzing internal error logs to determine the extent of the damage by mapping recent occurrences of unrecoverable media errors; and sending the unrecoverable-media-error data to a processor.

5. The method according to claim 4, further comprising, after determining the extent of unrecoverable media:

loading the read/write head back on the magnetic storage medium in order to sweep away debris; and unloading the read/write head after the debris is swept away.

6. The method according to claim 1, further comprising performing sequential read operations to recover data from the drive.

7. The method according to claim 6, wherein the head avoids accessing zones on the magnetic storage medium where there were multiple errors.

8. A system for detecting head-to-disk interference events in a disk drive, the system comprising:

a transducer attached to an air filter in the disk drive, wherein the transducer detects changes in electromagnetic readings due to debris flowing through the air filter, said debris produced by physical contact between a read/write head and a magnetic storage medium;

a microprocessor that monitors the transducer during disk drive operations and compares electromagnetic readings from the transducer with baseline parameters; and an intervention mechanism that, if the transducer readings exceed the baseline parameters, halts rotation of the disk and unloads the read/write head from the magnetic storage medium.

9. The system according to claim 8, wherein the electromagnetic readings measured by the transducer relate to at least one of the following:

conductance;

inductance; and capacitance.

10. The system according to claim 8, wherein the baseline electromagnetic parameters are established by sampling the transducer while powering up the disk drive.

11. The system according to claim 8, further comprising:

an error detection component that analyzes internal error logs to determine the extent of damage by mapping recent occurrences of unrecoverable media errors; and a communication component tat sends the unrecoverable-media-error data to a processor.

12. The system according to claim 8, further comprising a backup mechanism that performs sequential read operations to recover data from the drive.

13. The system according to claim 12, wherein the head avoids accessing zones on the magnetic storage medium where there were multiple errors.

14. A computer program product in a computer readable medium, for detecting head-to-disk interference events in a disk drive, the computer program product comprising:

instructions for monitoring a transducer during disk drive operations and comparing electromagnetic readings from the transducer with baseline parameters, wherein the transducer is attached to an air filter in the disk drive and detects changes in electromagnetic readings due to debris flowing through the air filter, said debris produced by physical contact between a read/write head and a magnetic storage medium; and if the transducer readings exceed the baseline parameters, instructions for halting rotation of the disk and unloading the read/write head from the magnetic storage medium.

15. The computer program product according to claim 14, wherein the electromagnetic readings measured by the transducer relate to at least one of the following:

conductance;

inductance; and capacitance.

16. The computer program product according to claim 14, wherein the baseline electromagnetic parameters are established by sampling the transducer while powering up the disk drive.

17. The computer program product according to claim 14, further comprising:

instructions for analyzing internal error logs to determine the extent of the damage by mapping recent occurrences of unrecoverable media errors; and instructions for sending the unrecoverable-media-error data to a processor.

18. The computer program product according to claim 17, further comprising, after determining the extent of unrecoverable media:

instructions for loading the read/write head back on the magnetic storage medium in order to sweep away debris; and instructions for unloading the read/write head after the debris is swept away.

19. The computer program product according to claim 14, further comprising instructions for performing sequential read operations to recover data from the drive.

* * * * *

UNITED STATES PATENT AND TRADEMARK OFFICE
CERTIFICATE OF CORRECTION

| | | |
|---|---|---|
| PATENT NO. | : 6,744,579 B2 | Page 1 of 1 |
| APPLICATION NO. | : 10/015379 | |
| DATED | : June 1, 2004 | |
| INVENTOR(S) | : Forrer, Jr. | |

It is certified that error appears in the above-identified patent and that said Letters Patent is hereby corrected as shown below:

Col. 8, line 5: after "component" delete "tat" and insert --that--.

Signed and Sealed this

Fifteenth Day of April, 2008

JON W. DUDAS
*Director of the United States Patent and Trademark Office*